United States Patent Office 3,102,820
Patented Sept. 3, 1963

3,102,820
FOOD PRODUCT
Stanley Barton, Springfield Township, Hamilton County, Ohio, assignor to The Procter & Gamble Company, Cincinnati, Ohio, a corporation of Ohio
No Drawing. Filed June 7, 1961, Ser. No. 115,319
2 Claims. (Cl. 99—204)

This invention relates to a new food product and to methods for making such product. More particularly, it relates to a simulative fruit granule which, when incorporated in baked goods, provides a delicious food treat.

The use of so-called "dry prepared mixes" for baked goods has achieved wide usage, particularly in the home. In mixes of this type, dry ingredients are combined in proper proportions and the mixes are then packaged. Liquid materials, such as water, milk, and/or eggs, are added to the mix to prepare a batter for use in baking. By utilization of these mixes, one of the problems in baking, variation of ingredients, has been eliminated to a large degree.

Many persons enjoy eating baked goods which contain edible fruit, such as fruit cake, blueberry muffins and blueberry pancakes.

For reasons of convenience, cost, and the prevention of variation in ingredients, it is clearly advantageous to both the manufacturer of the prepared mix and to the consumer that the desired type of fruit be intimately mixed with the dry ingredients of the prepared mix rather than being added after preparation of the batter by the consumer. It is not commercially feasible to intimately mix fresh fruit with the normal prepared mix, both because the substantial quantity of moisture present in fresh fruit initiates the leavening reaction during the normal marketing and culinary storage period, and because at the termination of such period both the fruit and mix are not fit for human consumption.

Although the use of dried fruit obviates the difficulties created by moisture, such use gives rise to various other disadvantages. The rate of rehydration of dried fruit is not sufficiently rapid to permit the fruit to rehydrate to the required degree during the baking cycle. Consequently, upon completion of the baking cycle the fruit does not possess the desired fresh fruit flavor and is tough. Moreover, it is difficult and expensive to dehydrate fruit commercially so that it can be readily rehydrated in the form of whole pieces.

Prepared mixes have been marketed containing a composition comprising sugar, nonfat dry milk solids, starch, coconut pulp, blueberry pulp, and artificial flavor and color. Other prepared mixes have also been marketed containing a composition comprising sugar, gum acacia, citric acid, starch, blueberry pulp, and artificial flavor and color. However, it is not commercially feasible to employ a substantial proportion of blueberry pulp. Therefore, the proportion of fruit in these compositions has been quite small.

Prior workers in the art also have suggested a composition which can be embodied in dough and baked, comprising dried fruit, such as prune, raisin, apricot and white fig; fibrous meat of nuts such as coconuts, babassu nuts and palm kernels; sugar; flavoring; and color. This composition is in paste form prior to being formed into pellets by a conventional pelleting machine. Alternatively it is converted into particles by initially forming sheets, strips or balls, and drying (usually to a moisture content of from about 5 to 10%). The dried sheets, strips or balls are then broken up by feeding them to a hammer mill. It is to be noted that these prior art workers specifically exclude, as unsuitable, the combination of cereal flours or starch with fruit for bakery use.

The use of fibrous nut meat as a filler has proven disadvantageous primarily because the cost of employing nut meats is commercially prohibitive. In addition, nut meats have a tendency toward rancidity, and, because of their greasiness, cannot be blended satisfactorily according to the method of this invention.

It has now been found that simulative fruit granules containing substantial proportions of fruit and edible filler can be prepared, provided certain essential limitations are observed.

It is an object of this invention to provide a simulative fruit granule which can be intimately combined with the ingredients of dry prepared mixes without undergoing undesirable physical and/or chemical change during the normal marketing and culinary storage period.

It is a further object to provide a simulative fruit granule which, when intimately combined with the dry ingredients of prepared mixes, made into a batter, and baked, demonstrates properties which are comparable to a high degree with those properties demonstrated by uncombined fresh fruit.

A still further object is to provide a simulative fruit granule containing a bland-flavored fruit, said granule being flavored and colored to simulate a more costly fruit.

Yet another object is to provide a simulative fruit granule containing an edible filler, said granule being characterized in that when combined with batter or dough and baked the granule itself does not bake and crack under heat, undergo a change in texture, impart a foreign taste to the product, or fail to retain an individual primal color base.

Further objects and advantageous features will be apparent from the following detailed description.

The simulative fruit granule of this invention comprises an intimate mixture of from about 18% to 71% of dried, pulverulent, bland-flavored fruit selected from the group consisting of apple, white grape and mixtures thereof; from about 15% to 70% of sugar selected from the group consisting of sucrose, glucose, dextrose, lactose and mixtures thereof, at least about 50% of said sugar being sucrose; from about 3% to 30% of edible filler selected from the group consisting of starch, cereal flour, and mixtures thereof; fruit flavor; and from 0% to about 6% water, by weight based on the weight of said granule.

As used herein, all percentage amounts are expressed in terms of weight on a dry solids basis unless otherwise specified.

Several methods for preparing the simulative fruit granule are available as part of this invention.

One method comprises, generally, the steps of intimately dry mixing from about 18% to 71% of the dried, pulverulent, bland-flavored fruit; from 3% to 30% of the edible filler, and fruit flavor. Sugar in an amount as hereinbefore specified is also added to the mixture, and at least a part of the sugar is in the form of an aqueous sugar syrup containing from about 40% to 80% sugar, by weight. The amount of syrup to be added should be sufficient to provide from about 7% to 13% of water in the mixture. The mixture should be stirred while the sugar syrup is being added, whereupon granules form. Thereafter the granules are dried to a water content not greater than about 6% by weight based on the total weight of the granules.

Alternatively all of the sugar is added to the mixture in dry form and water is added in an amount of about 7% to 13% by weight. The mixture is stirred while the water is being added to form granules, and these granules are thereafter dried. In general, the presence of larger amounts of water will result in the formation of larger granules.

It is essential to the successful practice of this invention that the constituents of the simulative fruit granule be employed within the aforementioned proportion ranges.

The fruits employed in this invention are limited to those having a bland flavor, as, for example, apple or white grape. Apple is preferred. The fruit should be in a dry and pulverulent form. If less than about 18% of dried, pulverulent fruit is used, the finished granule is too soluble and fails to retain a definite solid form during baking. The use of more than about 71% of such fruit gives a granule which fails to rehydrate sufficiently during the baking cycle.

The fruit may be dried by any known means, including vacuum drying, freeze-drying, air-drying and foam drying. For convenience, the fruit may be ground subsequent to the drying step. However, the invention is not intended to be limited to any particular method of preparing the dried pulverulent fruit.

The sugar employed must be of a type which recrystallizes readily and substantially after having been dissolved. Primarily for this reason, it is essential that at least about 50% of the sugar present in the completed granule be sucrose. The remainder can include glucose, dextrose or lactose, or mixtures thereof, although it is preferable that the entire sugar constituent be sucrose. It will be noted with reference to the hereinbefore described methods for preparing the simulative fruit granule that one method comprises adding at least part of the sugar in the form of sugar syrup made by dissolving sugar in water to form a syrup containing from about 40% to 80% sugar. In an alternate method the sugar is present in the intimate dry mixture in dry pulverulent form and water is added, forming a syrup in situ. When sugar is employed in an amount less than about 15%, there is difficulty in granule formation; the granules tend to crumble or break into smaller portions. Just as in the situation where an insufficient proportion of bland-flavored fruit is used, the use of more than about 70% of sugar forms a granule which is soluble to an undesirable degree.

Suitable edible fillers of this invention include flour derived from the cereal group, such as wheat, rye, barley, maize (corn), oats and rice, or mixtures thereof; edible starch derived from plants such as the above-mentioned cereals or tubers including potatoes and sweet potatoes; and mixtures of such flours and starch. In the preferred practice of the invention cornstarch is employed. Although the type of cereal flour is not to be regarded as a limitation of this invention, the use of flour derived from bland-flavored cereals, as, for example, wheat, is preferred. Granule formation is undesirably difficult when less than about 3% of edible filler is used, whereas its use in an amount more than about 30% results in a granule which is too powdery and chewy when eaten.

It is not necessary to remove all water from the granules. Although some variance occurs, depending upon the leavening system contained in the dry mix, it has been discovered that a simulative fruit granule containing up to about 6% water based on the total weight of the granule, can be initimately combined with conventional dry prepared mixes and stored for a period of time equal to the normal marketing and culinary storage period without the undesirable initiation of the leavening reaction or the occurrence of similar indicia of instability. If more than about 6% water is present, such undesirable effects do occur. Although no moisture is necessary, between about 1% and 2% is preferred.

It is desirable to add a small amount of fruit flavoring to achieve a similarity to particles of fruit. Additionally, the use of coloring material may also be desirable. Other minor ingredients, such as salt, can be present.

In regard to the use of granules in baked goods, the maximum advantages of the simulative fruit granules over both dried and fresh fruit are to be had by combining the granules with a dry prepared mix. However, a tremendous economic advantage is gained even if the granules are not admixed until such time as a batter has been prepared. For this reason, the stage at which granules are admixed in preparing baked goods should not be considered a limitation of this invention. Neither should the type of prepared mix or batter be regarded as a limitation, since satisfactory results are obtained regardless of the type of prepared mix or batter to which the granule is added. Well known cakes, such as yellow cake, white cake and chocolate cake, containing the granules of the invention can be prepared. In view of the fact that fruits are ordinarily combined with baked goods of the cake and cooky type, rather than in baked goods of the bread type, the granules of this invention also find avenues of usage in the former types of baked goods. However, outside of the factor of consumer preference, there is no reason prohibiting the combination of the granules in baked goods of the latter type. Also, the granules can be employed in other edible products such as candy and puddings.

To impart a mixed taste sensation of fruit and baked goods it is desirable that the size of the simulative fruit granule used in baked goods range from about $\frac{1}{16}$ inch to $\frac{1}{2}$ inch in diameter, although such size range is not essential. A variety of factors, such as the type of baked goods, the number of granule per unit area of baked goods, and the relative distinctiveness of the flavor of the granule, are determinative of the most desirable size in each case. Once the desired size is determined, granules of that size can be obtained by simple screening.

Similarly, the number of granules which should be contained in a baked goods is not essential, being determined largely both by the volume and type of the baked goods and by the flavor and size of the granules.

The following examples are illustrative of the invention; all amounts being expressed as parts by weight on a solids basis unless otherwise specified.

It is to be noted that Example I is intended to be illustrative both of the preferred composition of the simulative fruit granule of this invention and of the preferred method of making said granule.

*Example I*

| | Parts |
|---|---|
| Dehydrated applesauce (pulverulent, will pass through a 30 mesh screen) (colored blue) | 36 |
| Sucrose (baker's special sugar) | 36 |
| Cornstarch | 15 |
| Blueberry flavor (imitation) | 2 |

The above ingredients, in the proportions specified, were placed in a Sunbeam "Mixmaster" set at speed setting No. 1, and were dry blended. Then 11 parts (solids basis) of a 60% sucrose syrup were slowly added while simultaneously mixing the ingredients in the mixer at speed 1, thereby forming granules. The granules were dried overnight at about 100° F., which drying was sufficient to give a granule containing 1.5 parts, by weight, of water.

The dried granules were then screened and 50 grams of the screened granules (20 grams of which would not pass through a standard 10 mesh screen, 20 grams of which would not pass through a standard 8 mesh screen, and 10 grams of which would not pass through a standard 6 mesh screen) were mixed in a basic yellow cake batter. (All of the granules had a size within the range of about 1/16 to 1/2 inch.) Then the batter and granules were baked. When the finished cake was eaten, it was found that the granules imparted a distinct and delicious blueberry taste sensation.

Utilizing the above method, simulated fruit granules comparable to the above granules were also prepared employing 15 parts of cake flour rather than 15 parts of cornstarch.

*Example II*

| | Parts |
|---|---|
| Dehydrated applesauce (pulverulent, will pass through a standard 30 mesh screen) | 18 |
| Sucrose (baker's special sugar) | 55 |
| Cornstarch (containing a minor amount of orange color) | 7 |
| Orange flavor (natural) | 5 |

The above ingredients, in the proportions specified, were dry blended in the same manner as described in Example I. Then 15 parts (solid basis) of a 60% sucrose syrup were slowly added while simultaneously mixing the ingredients in a Sunbeam "Mixmaster" at speed 1, thereby forming similar granules. The granules were then dried in order to reduce the water content to 6 percent, based on the total weight of the granule.

*Example III*

| | Parts |
|---|---|
| Dehydrated applesauce (pulverulent, will pass through a standard 30 mesh screen) | 24 |
| Sucrose (baker's special sugar) | 24 |
| Cornstarch (containing a minor amount of orange color) | 29 |
| Orange flavor (natural) | 5 |

The above ingredients, in the proportions specified, were dry blended in the same manner as described in Example I. Then 18 parts (solids basis) of a 60% sucrose syrup were slowly added while simultaneously mixing the ingredients in a Sunbeam "Mixmaster" at speed 1, thereby forming granules. The granules were then dried in order to reduce the water content to 4 percent, based on the total weight of the granules.

*Example IV*

| | Parts |
|---|---|
| Dehydrated applesauce (pulverulent, will pass through a standard 30 mesh screen) | 39 |
| Sucrose (baker's special sugar) | 39 |
| Cornstarch (containing a mnior amount of orange color) | 3 |
| Orange flavor (natural) | 1 |

The above ingredients, in the proportions specified, were dry blended in the same manner as described in Example I. Then 18 parts (solids basis) of a 60% sucrose syrup were slowly added while simultaneously mixing the ingredients in a Sunbeam "Mixmaster" at speed 1, thereby forming granules. The remaining steps in the preparation of the simulated fruit granules are the same as described in Example I.

*Example V*

| | Parts |
|---|---|
| Dehydrated applesauce (pulverulent, will pass through a standard 30 mesh screen) | 71 |
| Cornstarch (containing a minor amount of orange color) | 5 |
| Orange flavor (natural) | 7 |

The above ingredients in the proportions specified, were dry blended in the same manner as described in Example I. Then 17 parts (solids basis) of a 60% sucrose syrup were slowly added while simultaneously mixing the ingredients in a Sunbeam "Mixmaster" at speed 1, thereby forming granules. The granules were then dried as described in Example I to give a granule containing 1.5 percent, based on the total weight of the granule, of water.

*Example VI*

| | Parts |
|---|---|
| Dehydrated white grape (pulverulent, will pass through a standard 30 mesh screen) | 38 |
| Sucrose (baker's special sugar) | 19 |
| Dextrose (pulverulent) | 19 |
| Cornstarch (containing a minor amount of orange color) | 16 |

The above ingredients, in the proportions specified are dry blended in the same manner as described in Example I. Then water in an amount of 15 parts is slowly added while simultaneously mixing the ingredients in a Sunbeam "Mixmaster" at speed 1, thereby forming granules. The granules are then dried to reduce the water content to 6 percent, based on the total weight of the granule.

Glucose, lactose, or mixtures thereof, can be substituted for dextrose in the above formula with comparable results.

*Example VII*

The simulative fruit granules of this invention can be intimately combined with dry prepared culinary mixes. For example, granules as described in the preceding examples can be added to a conventional dry prepared yellow cake mix having the following approximate composition:

| | Percent |
|---|---|
| Sugar | 42.9 |
| Cake flour | 40.4 |
| Shortening | 12.0 |
| Dry milk solids | 2.0 |
| Leavening | 1.5 |
| Salt | 1.0 |
| Flavor | 0.1 |
| Coloring | 0.1 |

Granules are added to the dry mix at a level of about 5%, by weight of mix. When water and eggs are added to the mix to form a batter, and the batter is baked, a delicious product is obtained, giving the impression of a product containing bits of fruit.

After being stored for about two years, a mix containing granules can still be baked into a delicious product.

The exact amount of the granules to be added to the mix will depend upon the type of mix, and amount of flavor desired, and therefore, the inclusion of any specific amount will not be critical. When granules of this invention are incorporated in other mixes such as muffin mixes, pancakes, or fruitcakes, comparable results are achieved.

What is claimed is:

1. A method for preparing simulative fruit granules which comprises intimately admixing from about 18% to 71% of dried, pulverulent, bland-flavored fruit selected from the group consisting of apple, white grape, and mixtures thereof, said pulverulent fruit having a particle size less than about 30 mesh; from about 3% to 30% of edible filler selected from the group consisting of starch, cereal flour, and mixtures thereof; and fruit flavor; additionally adding from about 15% to 70% of sugar selected from the group consisting of sucrose, glucose, dextrose, lactose, and mixtures thereof, at least about 50% said sugar being sucrose, and at least a part of said sugar being added in the form of an aqueous sugar syrup containing from about 40% to 80% sugar, by weight, the amount of syrup added being sufficient to provide from about 7% to 13% of water in the mixture; stirring said mixture while said sugar syrup is being added, whereby granules having an average diameter of about 1/16–1/2 inch are formed; and thereafter drying said granules to a water content of from 0% to about 6% by weight based on the total weight of the granules.

2. A method for preparing simulative fruit granules which comprises intimately admixing from about 18% to 71% parts of dried, pulverulent, bland-flavored fruit selected from the group consisting of apple, white grape, and mixtures thereof, said pulverulent fruit having a particle size less than about 30 mesh; from about 3% to 30% of edible filler selected from the group consisting of starch, cereal flour, and mixtures thereof; from about 15% to 70% of sugar selected from the group consisting of sucrose, glucose, dextrose, lactose, and mixtures thereof, at least about 50% of said sugar being sucrose; and fruit flavor; adding from about 7% to 13% water to said mixture, while stirring, thereby forming granules having an average diameter of about 1/16–1/2 inch; and drying the granules to a water content of from 0% to about 6% by weight based on the total weight of the granules.

References Cited in the file of this patent
UNITED STATES PATENTS

| | | |
|---|---|---|
| 1,374,160 | Fowler | Apr. 5, 1921 |
| 2,192,041 | Headband | Feb. 27, 1940 |
| 2,451,312 | Arengo-Jones | Oct. 12, 1948 |
| 2,451,313 | Arengo-Jones | Oct. 12, 1948 |